Sept. 25, 1923.
G. J. SMITH
DIMMER ATTACHMENT FOR VEHICLE LIGHTING SYSTEMS
Filed Feb. 20, 1922
1,468,756
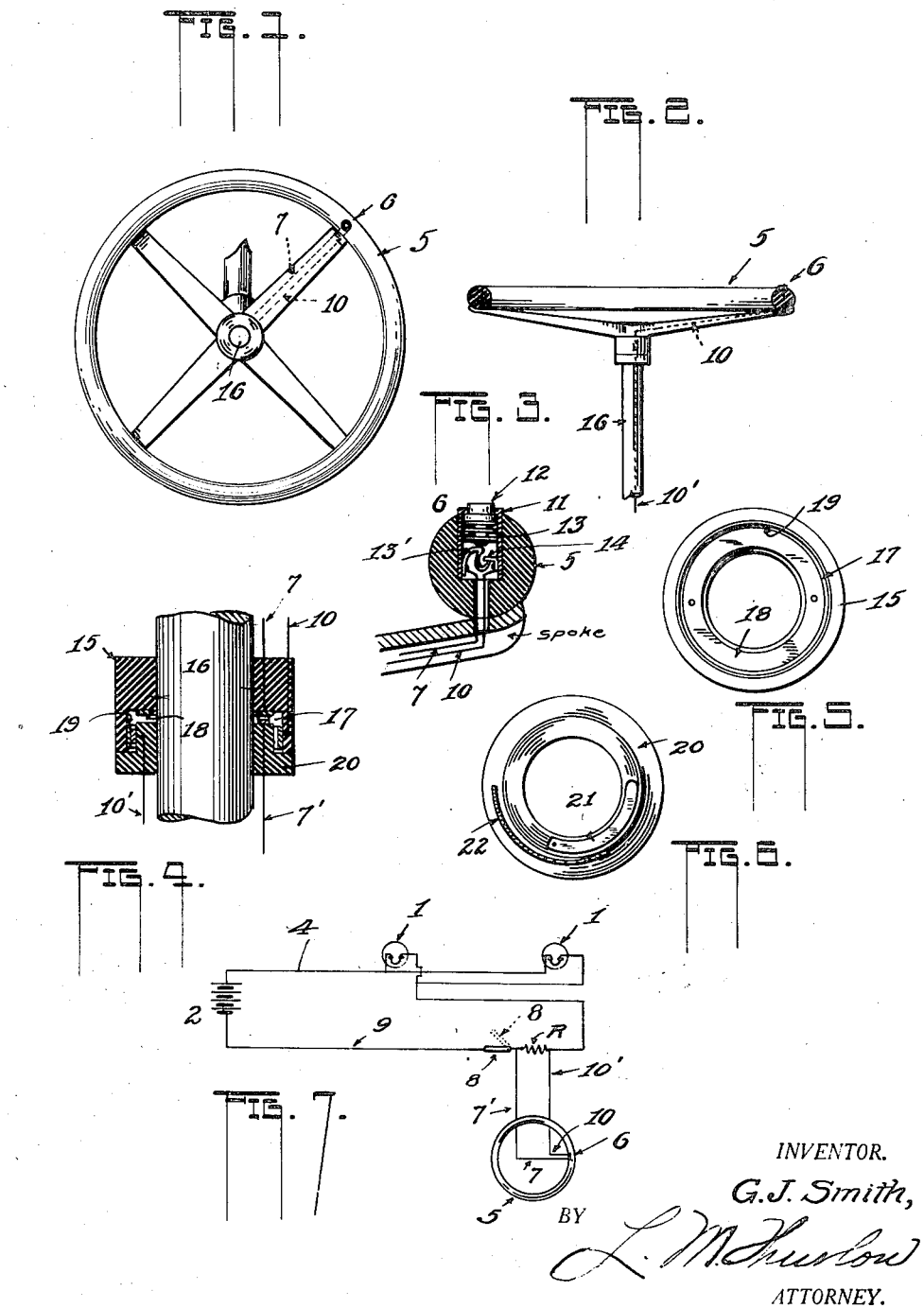
INVENTOR.
G. J. Smith,
BY
L. M. Thurlow
ATTORNEY.

Patented Sept. 25, 1923.

1,468,756

UNITED STATES PATENT OFFICE.

GEORGE J. SMITH, OF PEORIA, ILLINOIS.

DIMMER ATTACHMENT FOR VEHICLE LIGHTING SYSTEMS.

Application filed February 20, 1922. Serial No. 538,121.

*To all whom it may concern:*

Be it known that I, GEORGE J. SMITH, a citizen of the United States, residing at Peoria, in the county of Peoria and State of Illinois, have invented new and useful Improvements in Dimmer Attachments for Vehicle Lighting Systems; and I do hereby declare that the following is a full, clear, and exact description of the invention, which will enable others skilled in the art to which it appertains to make and use the same.

This invention relates to a dimming attachment for auto head lights. It relates more particularly to the control of the usual main head lights from the steering wheel of the vehicle.

The object of my invention is to interpose a resistance in the circuit of the main lamps, of the lighting system, which resistance is normally of no effect, but which, when it is necessary to cut down the amount of light as in meeting another vehicle, can be automatically placed in action to cut down the effective current through said main lamps to dim the same.

A further object is to employ a normally closed contact breaker, preferably upon the steering wheel, the main lamp circuit being closed therethrough, and to place a resistance in the circuit in such manner that while the current will normally flow around such resistance, the act of opening the contact breaker will cause the current to flow through said resistance to dim the otherwise brightly burning lamps.

In the accompanying drawing,—

Figure 1 is a plan of the steering wheel of a vehicle showing a button thereon.

Figure 2 is an elevation of the same in part section.

Figure 3 is a detail of the grasping portion of the steering wheel showing an arrangement of contact breaker therein and wires leading to and from the same.

Figure 4 is an elevation of part of a steering post showing insulating members thereon and certain electrical connections.

Figure 5 is a plan of one of the insulating members shown in Figure 4 as seen from below.

Figure 6 is a plan of another of said members, and

Figure 7 is a conventional diagram of the lighting circuit of an automobile showing my invention in connection therewith.

The inconvenience of having continually to snap off and on a switch either on the steering post or upon the instrument board of an automobile in order to either provide "dimmers" or strong lights is well known, and when this is done to dim the light it must again be done in order to restore the main or driving light and vice versa.

The numeral 1, Figure 7, designates the two main lamps of a lighting system for vehicles, 2 the usual source of current such as a storage battery, for example, and 3 and 4 are conductors connecting the lamps with one side of said battery.

5 designates the rim of the steering wheel of the vehicle having a normally closed contact breaker 6 thereon, Figures 1 and 3, the details of which will be described presently. Extending from one side of the said contact breaker is a conductor 7, 7' leading to a switch-arm 8, a conductor 9 leading from the switch to other said side of said battery 2. 10, 10' is a conductor connecting the other side of the contact breaker with the lamps 1, completing the circuit through said lamps which under such circumstances will burn brightly.

A resistance coil R is connected between the conductors 7 and 10 sufficient to dim the lights of said main lamps to the required extent when the current flows therethrough.

Having now described the circuit, the details of construction of the mechanical features of the other parts of my invention as used with said circuit will be made known.

The contact breaker 6 which is placed on the steering wheel, can be found without removing the hand from the wheel or taking the eye from the road, which is quite important especially where travel is heavy, the button being depressed or released at will.

In the Figure 3 the wheel "grip" or rim is bored to receive a housing 11, for example, of insulating material within which is a finger piece or button 12 controlled by a spring 13 held under compression by any suitable means not necessary to describe.

13' and 14 are current conductors or contact pieces, one of them being adapted to have spring action and normally contacting with the other. The conductors 7 and 10 are separately connected with those contact pieces and for convenience are carried down one of the spokes of the wheel to means for permitting the wheel to turn without breaking the circuit closed through the lamps.

This means consists, for example, of a sleeve 15 of insulating material secured upon the steering post 16, said sleeve having a recess 17 therein within which two metallic rings 18 and 19 are secured, in spaced relation, encircling the said post.

A second sleeve 20 within which the latter may turn abuts against the sleeve 15 and extends into said recess, said sleeve 20 being secured on the usual fixed housing (not shown) for the post. Said sleeve carries brushes 21, 22 to have permanent engagement with the rings 18, 19.

The conductors 7 and 10 are connected each to one of the rings 18, 19, the described conductors 7' 10' are separately connected to said brushes and lead down through the steering post housing (not shown) to the lamps and battery as previously explained.

The general arrangement of the connection for completing the circuit by way of the contact breaker on the wheel 5 is an example of a suitable manner of so doing but any other provision may be made that will give the desired result permitting the steering of the vehicle without interfering with such circuit.

It is observed that the said contact breaker 6 is normally closed so that the current flow is around the resistance R and lights the lamps fully.

Upon opening the breaker 6, however, the circuit is broken through the same and the current must then flow through said resistance R with the result that the lights are dimmed. The driver may hold the button 12 depressed as long as the dimming is necessary and his release of the same restores the condition of brightly lighted roadway. The switch 8 is provided, of course, in order that the circuit may be broken when the vehicle is not in use or for day driving.

My invention may be part of a motor car equipment or may be an attachment readily applied to any vehicle.

I claim:—

1. In combination with a source of current, the main lamps of a lighting system, and the steering wheel and steering post of a vehicle, a normally closed circuit breaker on the wheel, separate slidably related current carrying members mounted on the steering post, conductors separately connecting the terminals of the circuit breaker with the said members, conductors connecting the said members in circuit with the said current source and lamps, closing the circuit through the latter, and a resistance element bridging the conductors leading from the circuit breaker through which current is diverted when the latter is opened.

2. In combination with a source of current, the main lamps of a vehicle lighting system, and the steering wheel of a vehicle, of a normally closed circuit breaker on the wheel, a pair of separate current carrying members mounted on the steering post, a conductor connecting each member separately with one of the terminals of the said circuit breaker, a second pair of current carrying members also mounted on the steering post having contact with the members of the other pair, one of the pairs of members being movable with respect to the others in the movement of the steering wheel, and conductors connecting the said second pair of members with the source of current and the lamps, closing the circuit through the latter, and a resistance element bridging the conductors leading from the circuit breaker through which current is diverted when the latter is opened.

In testimony whereof I affix my signature in presence of two witnesses.

GEORGE J. SMITH.

Witnesses:
E. O. HUNT,
L. M. THURLOW.